US012722577B2

(12) United States Patent
Ni et al.

(10) Patent No.: US 12,722,577 B2
(45) Date of Patent: Sep. 1, 2026

(54) BICYCLE RACK

(71) Applicant: FORCOME (ZHEJIANG) CO., LTD., Jinhua (CN)

(72) Inventors: Xiaojun Ni, Jinhua (CN); Chengsheng Fang, Jinhua (CN); Weixiang Tong, Jinhua (CN)

(73) Assignee: FORCOME (ZHEJIANG) CO., LTD., Jinhua (CN)

( * ) Notice: Subject to any disclaimer, the term of this patent is extended or adjusted under 35 U.S.C. 154(b) by 131 days.

(21) Appl. No.: 18/970,768

(22) Filed: Dec. 5, 2024

(65) Prior Publication Data

US 2026/0159006 A1 Jun. 11, 2026

(51) Int. Cl.
*B60R 9/10* (2006.01)

(52) U.S. Cl.
CPC ...................................... *B60R 9/10* (2013.01)

(58) Field of Classification Search
None
See application file for complete search history.

(56) References Cited

U.S. PATENT DOCUMENTS 5,709,521 A * 1/1998 Glass ...................... B60R 9/042 224/310
D727,831 S 4/2015 Eriksson et al.
9,371,042 B1 * 6/2016 Dratewski ................ B60R 9/06
D788,019 S 5/2017 Kuschmeader et al.
D790,434 S 6/2017 Adler
9,802,549 B1 * 10/2017 Shen ......................... B60R 9/10
D813,784 S 3/2018 Larsson et al.
D817,256 S 5/2018 Adler et al.
10,183,627 B1 1/2019 Liu
D877,685 S 3/2020 Larsson et al.
D947,752 S 4/2022 Yu
D976,802 S 1/2023 Hsu
D995,402 S 8/2023 Sagen et al.
11,987,310 B2 * 5/2024 Huang ...................... B60R 9/06
D1,045,754 S 10/2024 Huo
D1,051,018 S 11/2024 Huo
2013/0062383 A1 * 3/2013 Jeli ........................... B60R 9/10 224/549
2017/0349111 A1 12/2017 Ramsdell et al.
2018/0001830 A1 1/2018 Olaison et al.
2018/0072237 A1 * 3/2018 Kuschmeader ........... B60R 9/10
2020/0156724 A1 * 5/2020 Kuschmeader ........... B60R 9/06
2021/0170955 A1 * 6/2021 Nusbaum ................. B60R 9/06
(Continued)

*Primary Examiner* — Derek J Battisti
(74) *Attorney, Agent, or Firm* — SZDC Law PC

(57) ABSTRACT

A bicycle rack includes a connecting rod, a turning device, a support rod device, and a vertical rod device. The connecting rod is formed by an upper connecting rod and a lower connecting rod which are connected by the turning device. The turning device includes a turning base, handle, pull rod, handle base, positioning pin, spring, and locking device. The locking device is formed by a V-shaped sheet, a screw sleeve, and an adjustment knob. One side of the V-shaped sheet is fixed to the positioning pin. A clamping opening is provided on the other side of the V-shaped sheet for clamping on the pull rod. The screw sleeve is obliquely disposed on a lower end of the upper connecting rod. A screw rod end of the adjustment knob is screwed on the screw sleeve, and the screw rod end can abut against a clamping opening end.

3 Claims, 4 Drawing Sheets

(56) References Cited

U.S. PATENT DOCUMENTS

| | | | | |
|---|---|---|---|---|
| 2022/0153205 | A1* | 5/2022 | Kuschmeader | B60D 1/145 |
| 2022/0355743 | A1* | 11/2022 | Huang | B60R 9/10 |
| 2023/0174179 | A1 | 6/2023 | Huang | |
| 2024/0075885 | A1* | 3/2024 | Stahl | B60R 9/06 |
| 2025/0083613 | A1* | 3/2025 | Williams | B60R 9/06 |

* cited by examiner

BICYCLE RACK

FIELD OF THE INVENTION

The present invention relates to a bicycle rack.

DESCRIPTION OF THE RELATED ART

A bicycle rack is usually connected to the rear of an automobile for fixing a bicycle.

For example, a bicycle rack claimed by the applicant previously in Patent Application No. CN202111184963.8 includes a connecting rod, a turning device, a support rod device, a vertical rod, and a strap. The connecting rod includes an upper connecting rod and a lower connecting rod. The upper connecting rod and the lower connecting rod are connected by the turning device, to enable the upper connecting rod to turn and fold through the turning device. The support rod device is disposed on the upper connecting rod. The support rod device includes two support rods disposed perpendicular to the upper connecting rod. A wheel base is disposed on each of two ends of the support rod. The vertical rod is further disposed on the upper connecting rod between the two support rods. A strap device is disposed on the vertical rod. The turning device includes a turning base disposed on one end of the upper connecting rod and a handle disposed on the other end of the upper connecting rod. A positioning bayonet is provided on the turning base. A positioning pin is disposed in the positioning bayonet. The positioning pin and the handle are connected by a pull rod disposed in the upper connecting rod. A spring is disposed on an end of the pull rod close to the handle. The pull rod makes the positioning pin abut against the positioning bayonet of the turning base through the spring. At present, the bicycle rack still has deficiencies in the following aspects: First, the positioning pin in the turning device abuts against the positioning bayonet of the turning base through only the force of the spring on an end of the pull rod, and no locking device is used to lock the positioning pin. When an automobile travels on a bumpy road, the spring is compressed due to the vibration of the handle and the pull rod, the positioning pin is detached from the positioning bayonet, and a bicycle falls down. Next, two bicycles carried by the bicycle rack are both fixed on one vertical rod. When being stored on the support rod device, the two bicycles need to be placed in opposite directions. In this way, handlebars of the two bicycles are kept from being held together. However, to fix two bicycles on a same vertical rod by the strap, it is necessary to keep the balance of the bicycles, and the strap can only be tied to top tubes of the bicycles. However, some bicycles have no top tubes, making it very difficult to fix such bicycles. Moreover, a strap base of the strap device of the bicycle rack is fixed on the vertical rod and is not rotatable. The strap can only be tied to a horizontal top tube of a bicycle. To fix a bicycle without a top tube, the strap needs to be tied to a down tube or a seat tube. A direction of the strap is not rotatable, making it very difficult to tightly tie the bicycle and the vertical rod.

SUMMARY OF THE INVENTION

In view of the deficiencies in the existing bicycle rack, a technical problem to be resolved by the present invention is to provide a bicycle rack wherein a positioning pin is used for fixing more reliably. In addition, the bicycle rack is further provided with dual vertical rods and a rotatable strap device.

To achieve the foregoing objectives, according to an aspect of the present invention, the present invention is implemented by using the following technical solutions: A bicycle rack includes a connecting rod, a turning device, a support rod device, and a vertical rod device. The connecting rod is formed by an upper connecting rod and a lower connecting rod. The upper connecting rod and the lower connecting rod are connected by the turning device. The turning device includes a turning base, a handle, a pull rod, a handle base, a positioning pin, and a spring. The turning device further includes a locking device. The locking device is formed by a V-shaped sheet, a screw sleeve, and an adjustment knob. One side of the V-shaped sheet is fixed to the positioning pin. A clamping opening is provided on the other side of the V-shaped sheet for clamping the pull rod. The screw sleeve is obliquely disposed on a lower end of the upper connecting rod. A screw rod end of the adjustment knob is screwed on the screw sleeve, and the screw rod end can abut against a clamping opening end of the V-shaped sheet by rotating the adjustment knob, to make the clamping opening abut against the pull rod tightly.

In the bicycle rack, the screw rod end of the adjustment knob can abut against the clamping opening end of the V-shaped sheet by rotating the adjustment knob, so that the clamping opening can fixedly clamp the pull rod to keep the pull rod from moving. Preferably, the support rod device includes two support rods in parallel, the middle portions of the two support rods are fixed on the upper connecting rod, and the two support rods are respectively located at two sides of the vertical rod device, a wheel base is disposed on each of two ends of the two support rod, and the wheel base is provided with a strap.

Preferably, the vertical rod device includes a fixing rod, two vertical rods, and a strap device, the fixing rod is a hollow rod with a cross-section being U-shaped, and a square notch is provided on a lower middle portion of the fixing rod, the notch clamps the upper connecting rod, and is welded to the upper connecting rod, the two vertical rods are disposed on the fixing rod at two sides of the notch, a strap device is disposed on an upper end of each of the two vertical rods, the strap device includes a fixing base, a connecting member, a rotating base, and a strap, the fixing base is a frame body provided with an opening on one side thereof, and is locked by a locking bolt at the opening, a hollow bolt post is disposed on the fixing base on a side opposite to the opening, the connecting member is U-shaped, a center of a closed end of the connecting member is movably fixed on the hollow bolt post of the fixing base by a bolt, making the connecting member rotatable, the rotating base is provided with a shaft hole on a side thereof, and the rotating base is fixed to two sides of an open end of the connecting member by a pin shaft which passes through two ends of the shaft hole, a latch is further disposed on the side of the rotating base, and the strap is fixed on the other side of the rotating base. The foregoing design implements the technical effect of a rotatable strap device.

Compared with the prior art, the invention has the following advantages: 1. The adjustment knob of the locking device abuts against the V-shaped sheet tightly to stably clamp the positioning pin in the positioning bayonet of the turning base, so that even if an automobile travels on a bumpy road, the pull rod is kept from pulling the positioning pin to detach from the positioning bayonet of the turning base due to vibration, thereby keeping a bicycle from falling off. If the upper connecting rod needs to be turned over, the adjustment knob is first released, to rotate the screw rod end of the adjustment knob to a position below the V-shaped sheet, and the pull rod can be pulled with the handle, to detach the positioning pin from the positioning bayonet of the turning base. 2. The vertical rod device is provided with one vertical rod at each of two sides of the upper connecting rod by the fixing rod. When two bicycles are placed in opposite directions, the two vertical rods are right on seat tubes below saddles of the bicycles. In this way, it is only necessary to tie and fix the seat tubes of the bicycles and the vertical rods through the strap, and fixing of a bicycle without a top tube is not affected. 3. The strap device can rotate by 360 degrees. In this way, tight fixing can be implemented even when an angle difference exists between a position of fixing a bicycle and the vertical rods.

BRIEF DESCRIPTION OF THE DRAWINGS

The accompanying drawings that constitute a part of the present invention are used to provide a further illustration of the present invention, and the schematic embodiments of the present invention and the description thereof are used to explain the present invention and do not constitute an improper limitation on the present invention. In the accompanying drawings.

Figure 1:
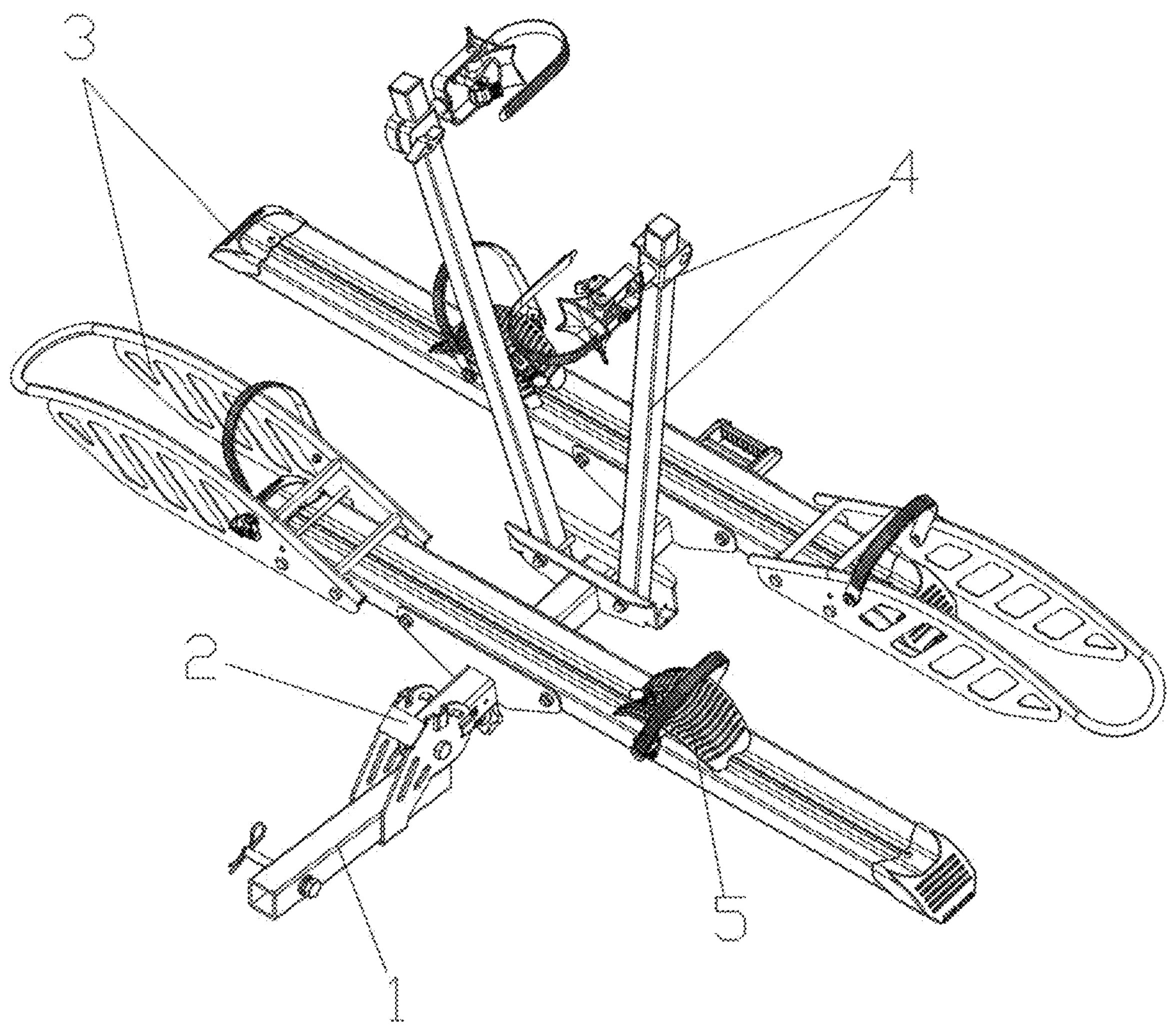
FIG. 1 is a schematic structural diagram of a bicycle rack according to the present invention.

Reference numerals: 1. connecting rod; 2. turning device; 3. support rod device; 4. vertical rod device; 5. wheel base; 6. lower connecting rod; 7. upper connecting rod; 8. turning base; 9. positioning bayonet; 10. positioning pin; 11. pull rod; 12. handle base; 13. handle; 14. V-shaped sheet; 15. screw sleeve; 16. adjustment knob; 17. fixing rod; 18. square notch; 19. vertical rod; 20. strap device; 21. fixing base; 22. locking bolt; 23. hollow bolt post; 24. connecting member; 25. rotating base; 26. pin shaft; 27. latch; and 28. strap.

DETAILED DESCRIPTION OF THE PREFERRED EMBODIMENTS

The present invention is described below in detail with reference to the accompanying drawings and in combination with the embodiments. It needs to be noted that the embodiments in this application and the features in the embodiments may be combined with each other without causing any conflict.

In the description of the present invention, it needs to be understood that orientation or location relationships indicated by terms "center", "up", "down", "left", "right", "vertical", "horizontal", "inside", "outside", "bottom", and "top" are based on orientation or location relationships shown in the accompanying drawings, and are only used to facilitate description of the present invention and simplify description, but are not used to indicate or imply that the apparatuses or elements must have specific orientations or are constructed and operated in specific orientations, and therefore, cannot be understood as a limit to the present invention.

Embodiment 1

Figure 2:
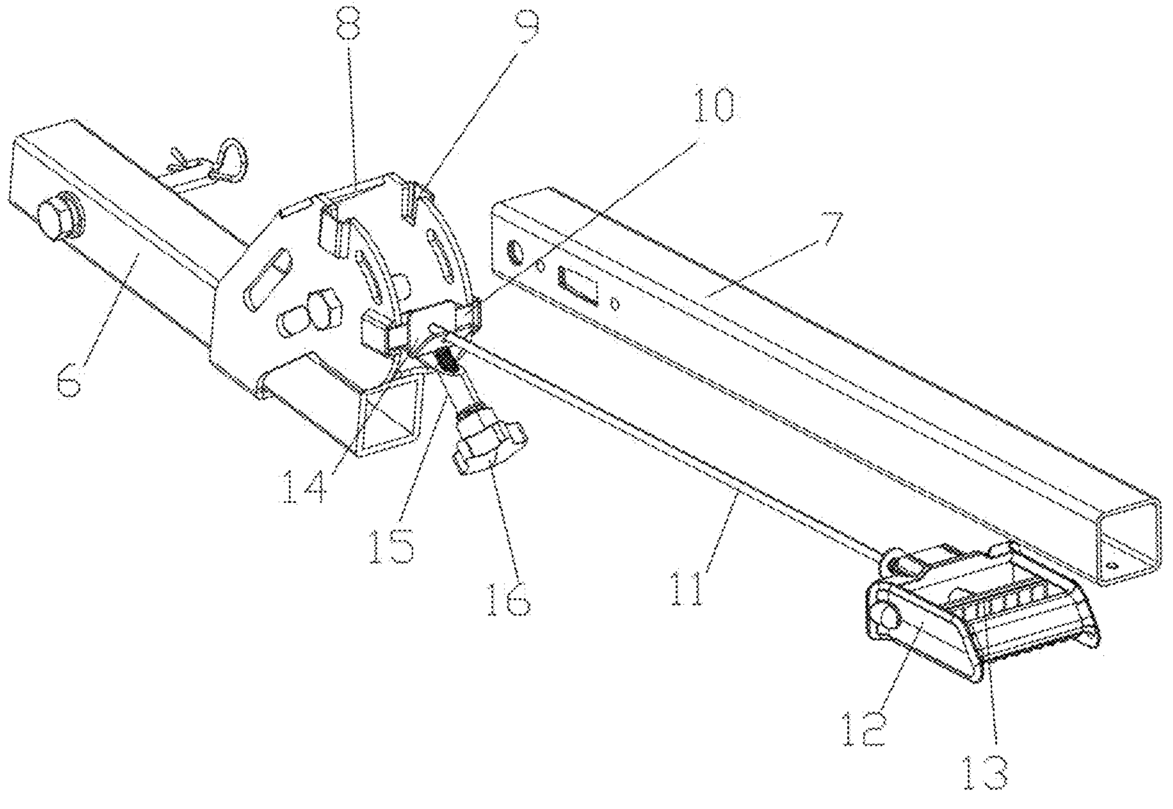
FIG. 2 is a schematic parts diagram of a turning device according to the present invention.

Referring to FIG. 1 and FIG. 2, a bicycle rack provided in this embodiment includes a connecting rod 1, a turning device 2, a support rod device 3, and a vertical rod device 4. The connecting rod 1 includes an upper connecting rod 7 and a lower connecting rod 6. An end of the upper connecting rod 7 and an end of the lower connecting rod 6 are connected by the turning device 2. The support rod device 3 includes two support rods in parallel. The middle portions of the two support rods are fixed on the upper connecting rod 7, and the two support rods are respectively located at two sides of the vertical rod device 4. A wheel base 5 is disposed on each of two ends of the support rod. The wheel base 5 is provided with a strap. The turning device 2 includes a turning base 8, a handle 13, a pull rod 11, a handle base 12, a positioning pin 10, a spring, and a locking device. The turning base 8 is a U-shaped base body, and is welded on the lower connecting rod 6. Each of two sides of an open end of the turning base 8 further extends upward to form an arc-shaped fixing plate. Hinge holes opposite to each other are opened on centers of the two arc-shaped fixing plates. A bolt passes through the hinge holes and the upper connecting rod 7 to initially fix the upper connecting rod 7 and the turning base 8. One positioning bayonet 9 is provided at each of an upper end edge and a middle edge of the arc-shaped fixing plate. A strip-shaped through hole is provided on the upper connecting rod 7 corresponding to the positioning bayonet 9, and the positioning pin 10 passes through one group of positioning bayonets 9 and the strip-shaped through hole to further fix the upper connecting rod 7 and the turning base 8. The handle 13 is movably fixed in the handle base 12. A right end of the pull rod 11 passes through the handle base 12 to be fixed with the handle 13, and a left end of the pull rod 11 is fixed with a middle of the positioning pin 10. A baffle sheet is welded on the right end of the pull rod 11 close to the handle 13. The spring is sleeved on the pull rod 11 between the baffle sheet and an outer wall of the handle base 12. The locking device includes a V-shaped sheet 14, a screw sleeve 15, and an adjustment knob 16. A left end of the V-shaped sheet 14 is welded on the positioning pin 10, and a U-shaped notch is opened on a right end of the V-shaped sheet 14. The pull rod 11 passes through the U-shaped notch. One obliquely disposed screw sleeve 15 is welded at a bottom of the upper connecting rod 7 at a lower right position of the V-shaped sheet 14, and the screw sleeve 15 is in communication with an internal cavity of the upper connecting rod 7. The adjustment knob 16 is screwed on the screw sleeve 15, and a screw rod end of the adjustment knob 16 passes through the screw sleeve 15 to abut against a U-shaped notch side of the V-shaped sheet 14.

Figure 3:
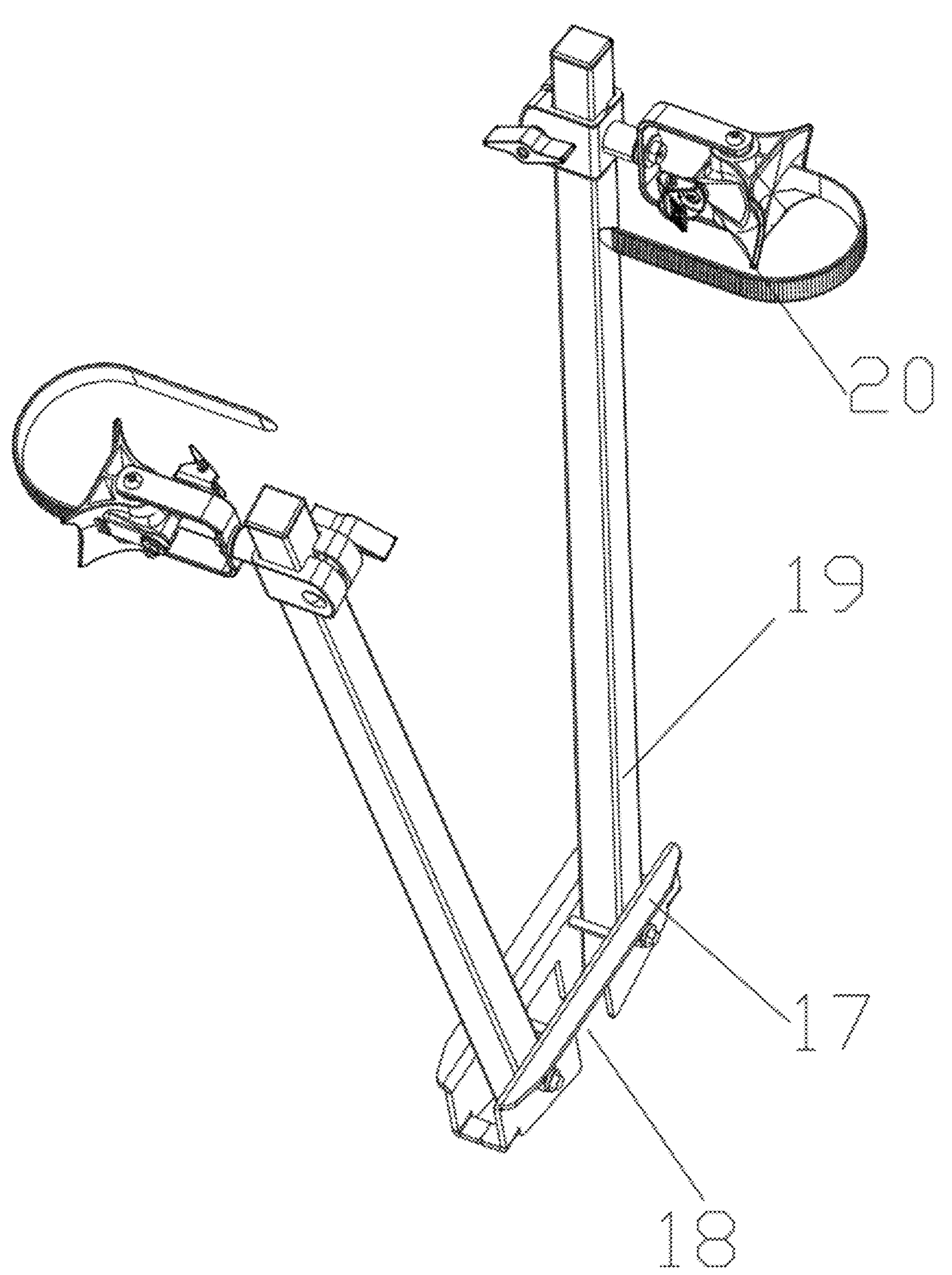
FIG. 3 is a schematic parts diagram of a vertical rod device according to the present invention.
Figure 4:
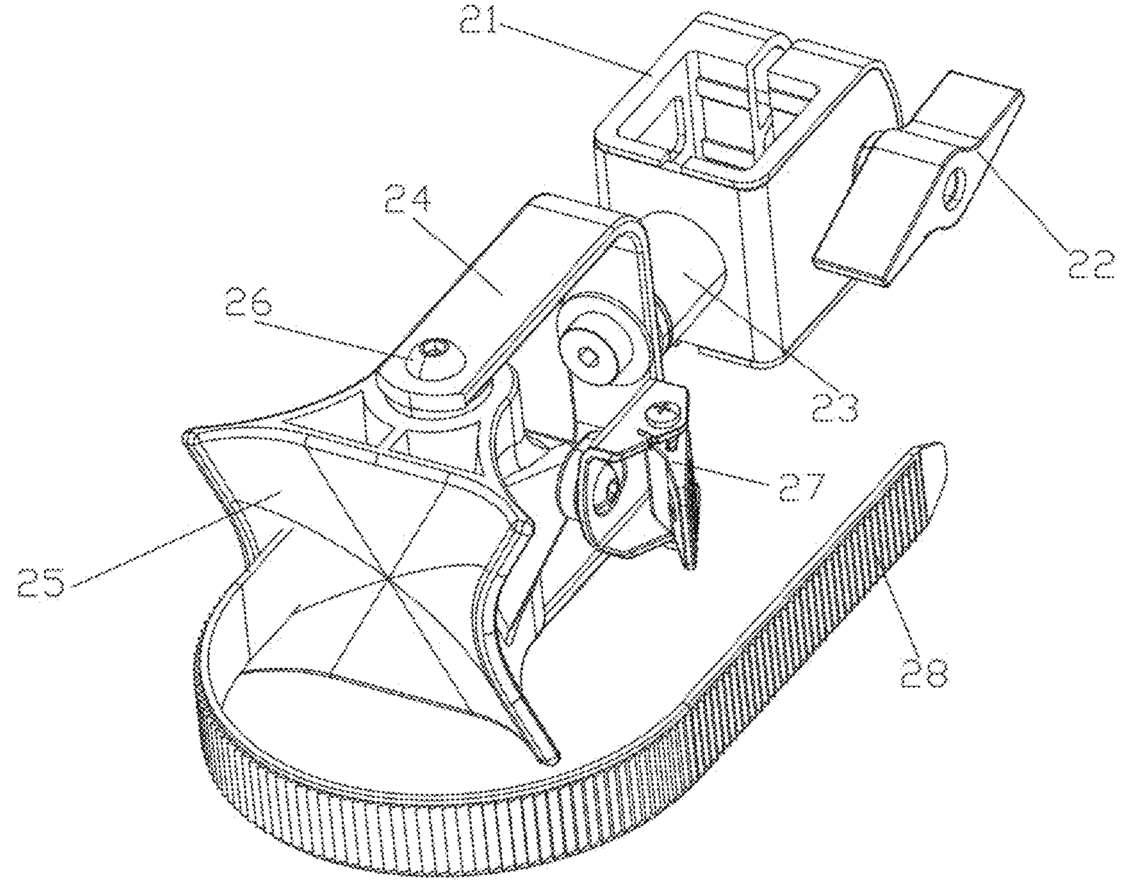
FIG. 4 is a schematic structural diagram of a strap device according to the present invention.

Referring to FIG. 3 and FIG. 4, the vertical rod device 4 includes a fixing rod 17, two vertical rods 19, and a strap device 20. The fixing rod 17 is a hollow rod with a cross-section being U-shaped, and a square notch 18 is provided on a lower middle portion of the fixing rod. The square notch 18 clamps the upper connecting rod 7, and is welded to the upper connecting rod 7. One vertically upward vertical rod 19 is disposed on each of two ends of the fixing rod 17 at two sides of the square notch 18. One strap device 20 is fixed on an upper end of each of the two vertical rods 19. The strap device 20 includes a fixing base 21, a connecting member 24, a rotating base 25, and a strap 28. The fixing base 21 is a frame body provided with an opening on an inner side thereof, and an opening end of the fixing base 21 is locked by a locking bolt 22 passing through sidewalls of the fixing base 21 on two sides of the open end. A hollow bolt post 23 is fixed on an outer side of the fixing base 21 on a side opposite to the opening. The connecting member 24 is U-shaped. A center of a closed end of the connecting member is movably fixed on the hollow bolt post 23 of the fixing base 21 by a bolt, making the connecting member 24 rotatable. The rotating base 25 is provided with a shaft hole on an inner side thereof, and is fixed to two sides of an open end of the connecting member 24 by a pin shaft 26 passing through two ends of the shaft hole. A latch 27 is further disposed on the side of the rotating base 25. The strap 28 is fixed on the other side of the rotating base 25.

In the bicycle rack provided in this embodiment, the locking device is disposed on the turning device 2 of the bicycle rack. The adjustment knob 16 of the locking device abuts against the V-shaped sheet 14 tightly to stably clamp the positioning pin 10 in the positioning bayonet 9 of the turning base 8, so that even if an automobile travels on a bumpy road, the pull rod is kept from pulling the positioning pin to detach from the positioning bayonet of the turning base due to vibration, thereby keeping a bicycle from falling off. If the upper connecting rod 7 needs to be turned over, the adjustment knob 16 is first released, to rotate the screw rod end of the adjustment knob 16 to a position below the V-shaped sheet 14, and the pull rod 11 can be pulled by the handle 13, to detach the positioning pin 10 from the positioning bayonet 9 of the turning base 8. Moreover, the vertical rod device 4 is provided with one vertical rod 19 at each of two sides of the upper connecting rod 7 by the fixing rod 17. When two bicycles are placed in opposite directions, the two vertical rods 19 are right on seat tubes below saddles of the bicycles. In this way, it is only necessary to tie and fix the seat tubes of the bicycles and the vertical rods 19 through the strap, and fixing of a bicycle without a top tube is not affected. Further, for the strap device 20 of the bicycle rack, a strap base of the strap device 20 is composed of the fixing base 21, the connecting member 24, and the rotating base 25. The strap 28 of the strap device 20 can rotate by 360 degrees in a horizontal direction and a vertical direction. In this way, tight fixing can be implemented even when an angle difference exists between a position of fixing a bicycle and the vertical rods.

Described above are merely preferred embodiments of the present invention, and are not intended to limit the present invention. Various changes and variations may be made to the present invention by a person skilled in the art. Within the spirit and principles of the invention, any modifications, equivalent substitutions, improvements, and the like are within the protection scope of the invention.

What is claimed is:

1. A bicycle rack, comprising a connecting rod, a turning device, a support rod device, and a vertical rod device, the connecting rod being formed by an upper connecting rod and a lower connecting rod, the upper connecting rod and the lower connecting rod being connected by the turning device, the turning device comprising a turning base, a handle, a pull rod, a handle base, a positioning pin, and a spring, wherein the turning device further comprises a locking device, the locking device is formed by a V-shaped sheet, a screw sleeve, and an adjustment knob, one side of the V-shaped sheet is fixed to the positioning pin, a clamping opening is provided on the other side of the V-shaped sheet for clamping the pull rod, the screw sleeve is obliquely disposed on a lower end of the upper connecting rod, a screw rod end of the adjustment knob is screwed on the screw sleeve, and the screw rod end can abut against a clamping opening end of the V-shaped sheet by rotating the adjustment knob, to make the clamping opening abut against the pull rod tightly.

2. The bicycle rack according to claim 1, wherein the support rod device comprises two support rods in parallel, the middle portions of the two support rods are fixed on the upper connecting rod, and the two support rods are respectively located at two sides of the vertical rod device, a wheel base is disposed on each of two ends of the two support rod, and the wheel base is provided with a strap.

3. The bicycle rack according to claim 1, wherein the vertical rod device comprises a fixing rod, two vertical rods, and a strap device, the fixing rod is a hollow rod with a cross-section being U-shaped, and a square notch is provided on a lower middle portion of the fixing rod, the notch clamps the upper connecting rod, and is welded to the upper connecting rod, the two vertical rods are disposed on the fixing rod at two sides of the notch, a strap device is disposed on an upper end of each of the two vertical rods, the strap device comprises a fixing base, a connecting member, a rotating base, and a strap, the fixing base is a frame body provided with an opening on one side thereof, and is locked by a locking bolt at the opening, a hollow bolt post is disposed on the fixing base on a side opposite to the opening, the connecting member is U-shaped, a center of a closed end of the connecting member is movably fixed on the hollow bolt post of the fixing base by a bolt, making the connecting member rotatable, the rotating base is provided with a shaft hole on a side thereof, and the rotating base is fixed to two sides of an open end of the connecting member by a pin shaft which passes through two ends of the shaft hole, a latch is further disposed on the side of the rotating base, and the strap is fixed on the other side of the rotating base.

* * * * *